United States Patent [19]
Lee et al.

[11] Patent Number: 5,327,416
[45] Date of Patent: Jul. 5, 1994

[54] SURFACE SELECTION MECHANISM FOR OPTICAL STORAGE SYSTEM

[76] Inventors: Neville K. Lee, 59 Spywood Rd., Sherborn, Mass. 01770; Amit Jain, 64 Nashoba Dr., Marlborough, Mass. 01752; Alina L. Gutierrez, 32 Marlboro St., Hudson, Mass. 01749

[21] Appl. No.: 20,512

[22] Filed: Feb. 22, 1993

[51] Int. Cl.⁵ .................... G11B 7/00; G02B 26/08
[52] U.S. Cl. .................... 369/199; 369/44.14; 369/112; 359/213; 359/196
[58] Field of Search ............... 369/195, 199, 244, 249, 369/277, 44.14, 112; 359/618, 585, 214, 213, 196

[56] References Cited

U.S. PATENT DOCUMENTS

| | | | |
|---|---|---|---|
| 733,090 | 7/1903 | Szczepanik | 359/618 |
| 3,419,329 | 1/1964 | Vogeleye t al. | 359/618 |
| 4,567,585 | 1/1986 | Gelbart | 369/97 |
| 4,623,776 | 11/1986 | Buchroeder et al. | 359/618 |
| 4,720,088 | 1/1988 | Tamura | 267/158 |
| 4,857,781 | 8/1989 | Shih | 310/12 |
| 4,926,403 | 5/1990 | Tsuyuguchi et al. | 369/199 |
| 5,081,618 | 1/1992 | Abe | 369/195 |
| 5,136,414 | 8/1992 | Jenkins | 359/213 |
| 5,185,676 | 2/1993 | Nishiberi | 359/213 |
| 5,202,880 | 4/1993 | Lee et al. | 369/277 |

FOREIGN PATENT DOCUMENTS 4001243  7/1991  European Pat. Off. ............ 359/213

Primary Examiner—A. J. Heinz
Assistant Examiner—Allen Cao
Attorney, Agent, or Firm—Albert P. Cefalo; Ronald C. Hudgens; Barry N. Young

[57] ABSTRACT

A surface selection mechanism is disclosed for an optical disk storage system. The mechanism comprises a linearly movable slider having a first and second mirror mounted side by side thereon. The first and second mirrors have reflective mirrors positioned at right angles with respect to each other. The mechanism includes apparatus for positioning the slider so that either the first or second mirror is positioned at the optical axis of a light beam to direct the light beam at either a first or a second recording surface of a double sided disc.

3 Claims, 6 Drawing Sheets

SURFACE SELECTION MECHANISM FOR OPTICAL STORAGE SYSTEM

This invention relates generally to optical storage systems, and more particularly to a surface selection mechanism for optical storage systems.

BACKGROUND OF THE INVENTION

Conventional optical disc storage systems, typically use a single optical sub-assembly, including a light source and a light detector, to read or write the information on an optical disc, such as for example, a compact disc (CD). Therefore, most CDs only have information recorded on a single side. The "flip" side of the CD is generally not used.

In order to access both sides of a double-sided CD, the CD must be flipped over by the user. The problem with such systems is that only one side of recorded information is accessible at any one time, and also the CD is more likely to be damaged due to excessive handling.

FIG. 1 shows the problems associated with delivering a light beam from a single optical subassembly to both sides of an optical disc. In FIG. 1, there is shown an optical storage system of the type that can advantageously use the invention. It should be understood that the optical subassembly 5 generates a single light beam along the path indicated by reference numeral 1. The problem is to selectively direct this light beam along paths 1' and 1" to a first and second recording surface 11 and 12 of the disc 10 snap mounted onto the end of a spindle 21. The spindle 21 and the disc 10 are rotated by a motor 22.

The system further includes a first and a second directing mirror 41, and 42 for directing the light beam parallel to the plane of the disc 10, along either path 1' or path 1".

A first and second reflecting mirror 51 and 52 are attached to the end of actuator arms 61 and 62. The arms 61 and 62 radially position the reflecting mirrors 51 and 52 relative to the recording surfaces 11-12 of the disc 10. The reflecting mirrors 51 and 52 reflect the light beams from path 1' or path 1", perpendicularly to the recording surfaces 11 and 12, respectively.

At the recording surfaces 11 and 12, the light beam is modified and reflected back along its incident path to the optical subassembly 5, where the modified and reflected light beam is decoded and processed.

The embodiments of the invention described herein are envisioned for use with magneto-optical disc technology. In magneto-optical disc technology the well known Hall effect is used to modify the light beam at the recording surface. Read-only discs use variations in the surface topology of the recording surface to modify the light beam. However, the mechanism disclosed is also applicable to other optical disc technologies, fixed or removable, single or multi-disk, and including write once, read only, and audio and video CD.

The problems which exist in the system occur at the point generally indicated by reference numeral X. Means need to be provided which can rapidly, inexpensively, and selectively direct the light beam from path 1 to either path 1' or path 1".

Prior art system have used galvo-galvanic mirrors at point X. "Galvo-mirrors" are well known in the art. However, galvo-mirrors are relatively expensive and require complex servo control systems to accurately rotate the mirror to the desired angles. Also galvo mirrors may require longer settling times after positioning which induced latency into the system.

SUMMARY OF THE INVENTION

This problem is solved by the present invention of a surface selection mechanism for an optical storage system. The mechanism comprises a linearly movable slider having a first and second mirror mounted thereon. The first and second mirrors have reflective mirrors positioned at right angles with respect to each other. Means are provided for linearly positioning the slider so that either the first or second mirror is positioned at the optical axis of a light beam to direct the light beam at either a first or second recording surface of an optical disc.

The advantages of the invention are due to a higher accuracy in the settling location of a linearly activated slider. As long as the light beam is beyond the border of the reflective surface, even should the mirror still be moving relative to the light beam, the light beam will be properly directed. In addition, the slidable mounted mirrors are more cost effective to implement than prior art surface selection devices.

BRIEF DESCRIPTION OF THE DRAWINGS

These and other features and advantages of the present invention will become apparent from a reading of the detailed description in conjunction with the attached drawings in which like reference numerals refer to like elements in the several views.

DETAILED DESCRIPTION OF THE PREFERRED EMBODIMENT

Figure 1:
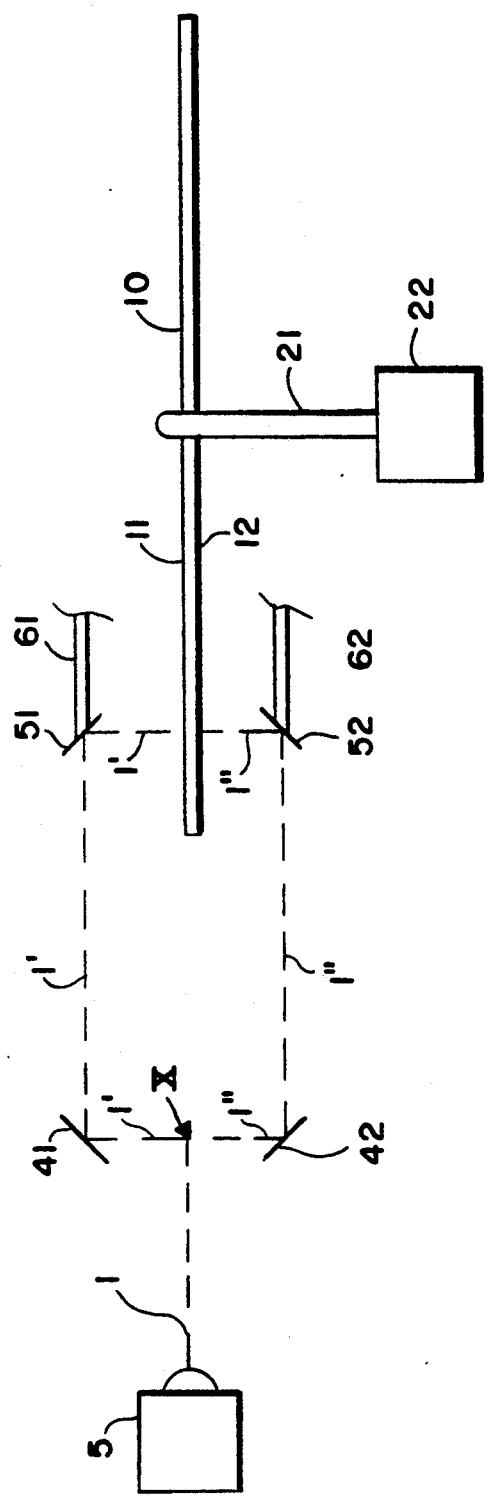
FIG. 1 is a schematic view of an optical storage system which can use the present invention.
Figure 2:
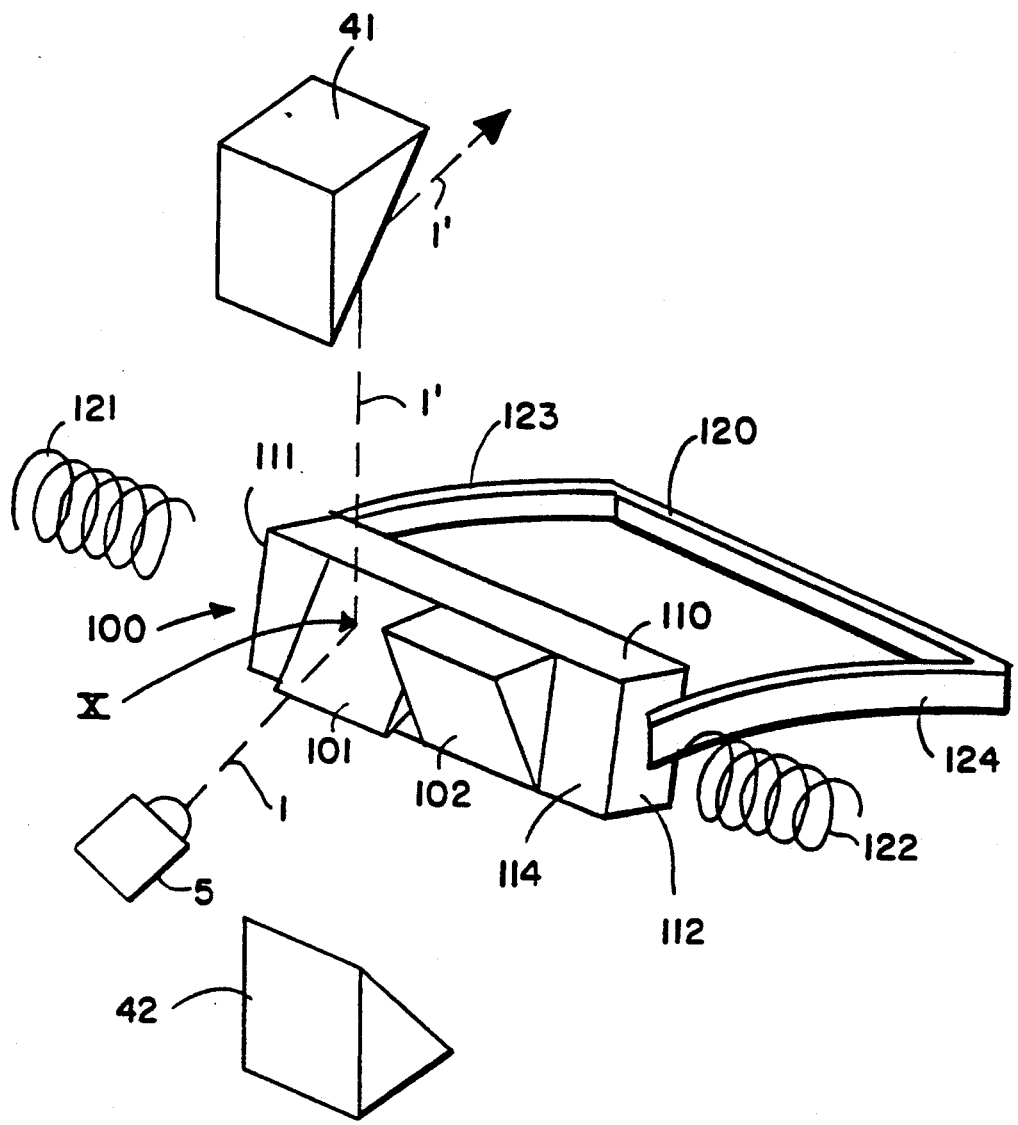
FIG. 2 is a perspective view of a surface selection mechanism, according to the preferred embodiment of the invention, in a first position.
Figure 3:
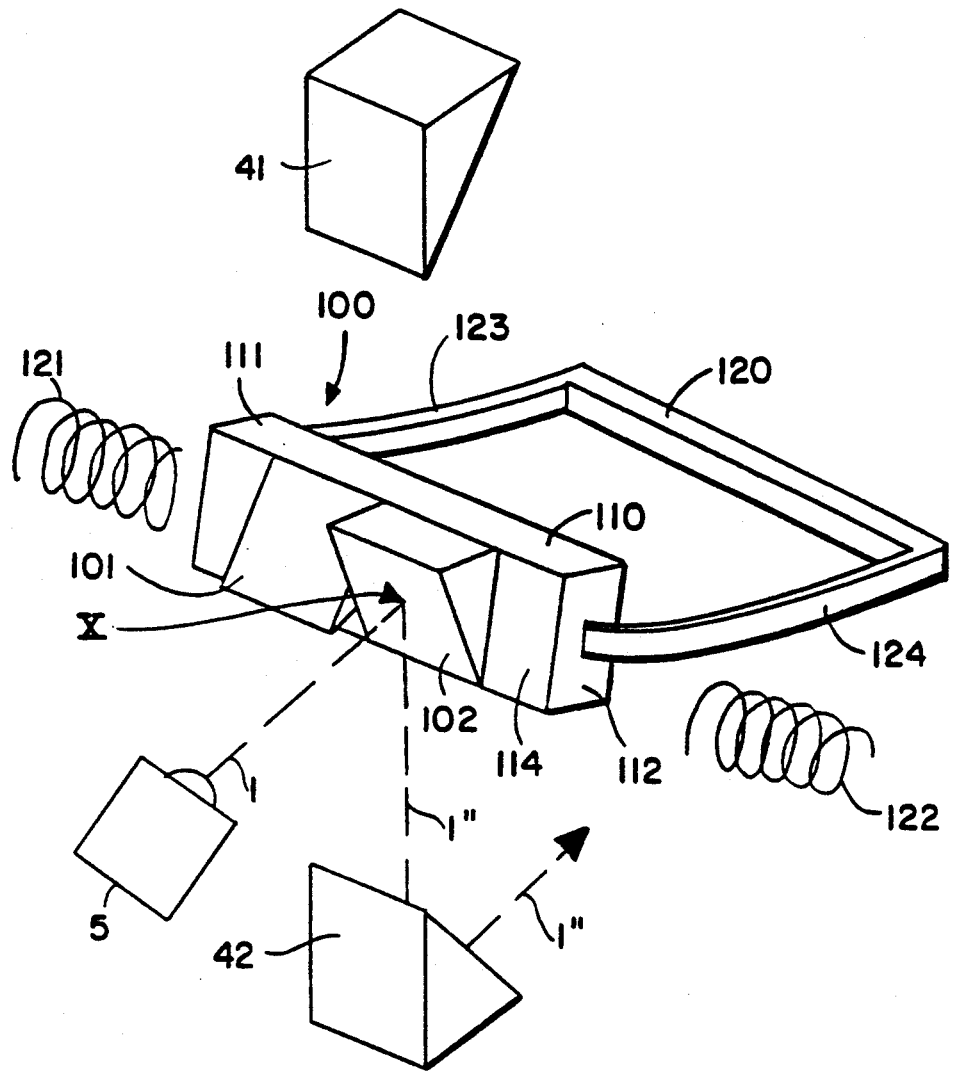
FIG. 3 is a perspective view of the surface selection mechanism in a second position.

FIGS. 2 and 3 show a preferred embodiment of the invention of a surface selection mechanism 100 for an optical storage system. It is intended that the mechanism 100 be placed at point X of FIG. 1 to selectively direct the light beam from path 1 to either path 1' or path 1".

The surface selection mechanism 100 comprises a slider 110 having a mounting surface 114, and a first and second end portion 111 and 112. The mounting surface 114 faces in the direction of the incident light beam along path 1 as shown in FIG. 1.

The slider 110 preferably includes a ferromagnetic material, or alternatively is made as a permanent magnet. The end portion 111 and 112 are fixed to a flexure 120 having flexure arms 123 and 124. The flexure 120 is generally U-shaped, with the end of the arms 123-124 attached to the end portions 111 and 112 of the slider 110, respectively. The flexure 120 is preferably made of a spring-like material, such as steel. The flexure is arranged to constrain the motion of the slider 110 in a linear direction with respect to the light beam.

A first and second stationary winding 121 and 122 are located adjacent to each end portion 111 and 112 of the slider 110. The axis of the windings 121 122 are parallel to, and in-line with the linear axis of the slider 110. The slider 110 is reciprocated in a linear direction in response to a magnetic field generated by the windings 121 and 122.

A first and second selecting mirror 101 and 102 are mounted on the mounting surface 114 of the slider 110. The selecting mirrors 101 and 102 are disposed side by side with the reflecting surfaces of the selecting mirrors 101 and 102 at fight angles with respect to each other. That is, each selecting mirror 101 and 102 is at an angle of 45° with respect of the optical axis of the light beam. The selecting mirrors 101 and 102 can also be 45° folding prisms.

During operation of the disc storage system shown in FIG. 1, the disc 10 is rotated at a high speed. The arms 61 and 62 position the reflecting mirrors 51 and 52 adjacent to the recording surfaces 11 and 12. The optical subassembly 5 generates a light beam which is directed at the double-sided disc 10 along path 1 generally in the same plane as disc 10.

The windings 121 and 122 are energized, to linearly reciprocate the slider 110 along an axis which is at fight angles with respect to the axis of the light beam along path 1. To direct the light beam along path 1' to the first recording surface 11 of the disc 10, the first selecting mirror 101 is placed at point X, as is shown in FIG. 2. To direct the light beam at the second recording surface, the second selecting mirror 102 is placed at point X to direct the light beam along path 1''. The linear motion of the slider 110 allows the light beam to be directed in directions differing by an angle of 180° depending whether the first or second selecting mirrors 101-102 are positioned at point X.

Figure 4:
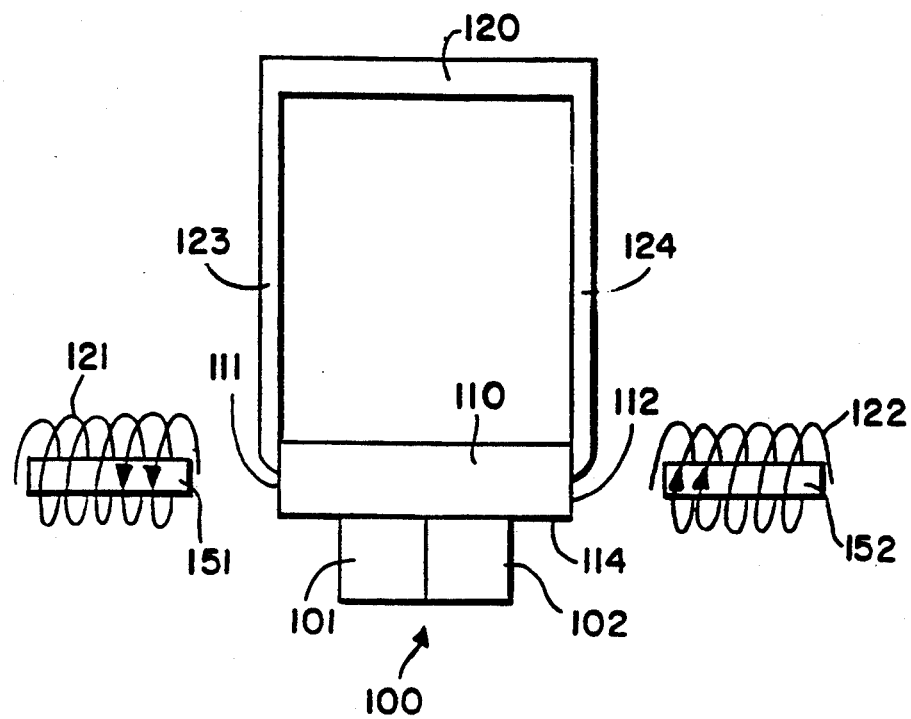
FIG. 4 is a top plan view of a surface section mechanism according to an alternative embodiment.

An alternative embodiment of the surface selection mechanism is shown in FIG. 4 in plan view. In FIG. 4, iron cores 151 and 152 are inserted in the first and second windings 121 and 122, respectively, to increase the strength of the magnetic field to move the slider 110.

Figure 5:
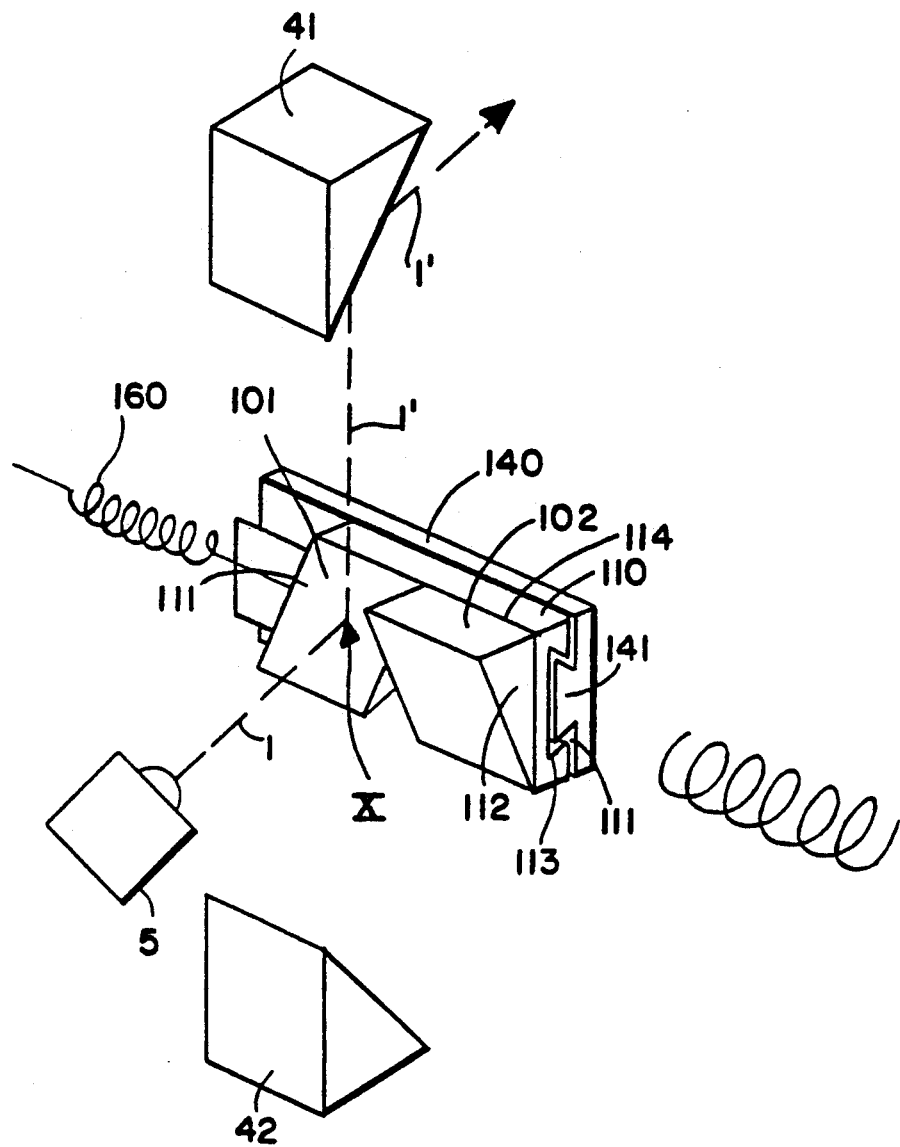
FIGS. 5 and 6 are perspective views of yet another alternative embodiment.
Figure 6:
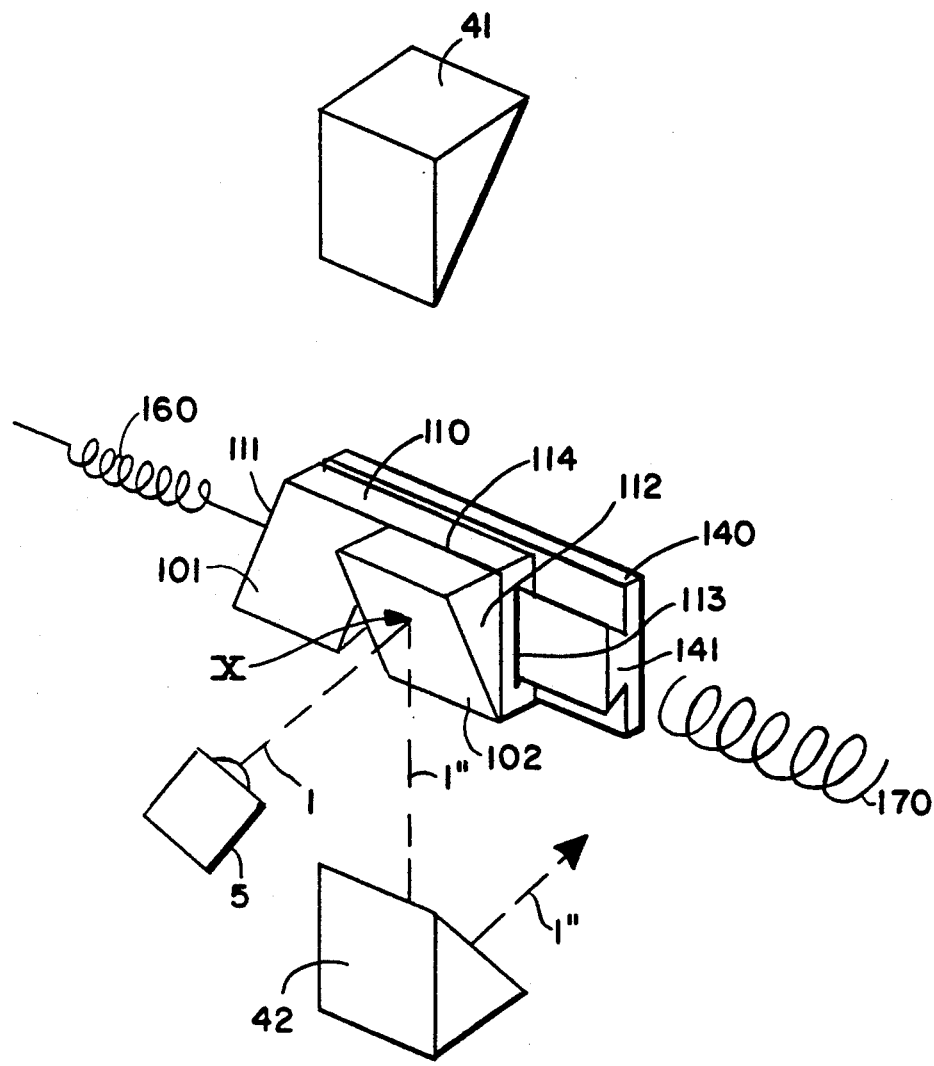

FIGS. 5 and 6 shows yet another alternative embodiment. In FIGS. 5 and 6, the slider 110 is mounted on a slide 140. The slider 110 includes a groove 113 to engage with a complementary tongue 141 formed on the mating side of the slide 140. The length of the slide 140 is made longer than the length of the slider 110 so that the slider 110 can linearly move end to end on the slide 140 to selectively position the selecting mirrors 101 and 102 at point X. In this embodiment, the first end portion 111 of the slider 110 is attached to a spring 160. And a winding 170, (with or without an iron core) is placed at the second end portion 112 of the slider 110. The energized winding 170 is used to pull the slider 110 to the position shown in FIG. 5. The spring 160 is used to pull the slider 110 to the position shown in FIG. 6 when the winding 170 is not energized.

The invention has the advantage that the linear translation of the mirror pair 101 and 102 does not require accuracy as to its settling location. That is, as long as some portion of the selected mirror 101 or 102 is at point X the light beam will be reflected to the disc 10 either along path 1' or 1''. Whereas, a rotating mirror on a galvanometer requires a higher degree of angular accuracy in order to select a recording surface. Also the linear actuated selection mechanism is more cost effective to implement as compared with prior art surface selection mechanism.

While there has been shown and described preferred embodiments of a surface selection mechanism for optical disk drives, it is to be understood that various other adaptations and modifications may be made within the spirit and scope of the invention.

What is claimed is:

1. An apparatus for selectively directing a light beam at a first or a second recording surface of an optical storage disc, comprising:
    a linearly movable member positioned in the path of the light beam;
    first and second mirrors mounted side by side on said member, said mirrors being disposed at right angles to each other;
    means for linearly moving said member to position said first mirror or said second mirror in the path of the light beam, one of the first and second mirrors being positioned when brought into the path of said light beam to reflect the beam of light from such first mirror along a path extending in a direction laterally of the first recording surface of said optical disc, the other of the first and second mirrors being positioned when brought into the path of said light beam to reflect the beam of light from such second mirror along a path extending in a direction laterally of the second recording surface of said optical storage disc;
    first and second directing mirrors being in spaced apart relationship with said first and second mirrors and being in spaced apart relationship with each other, one of said directing mirrors being located both radially outwardly of said optical storage disc and laterally outwardly of said first recording Surface of such disc, the other one of said directing mirrors being located both radially outwardly of said optical storage disc and laterally outwardly of said second recording surface of such disc, one of said first and second directing mirrors being positioned to receive the beam of light reflected from the one of the first and second mirrors and to reflect the received beam to travel along a path extending generally parallel to and spaced from said first recording surface, the other of said first and second directing mirrors being positioned to receive the beam of light reflected from the other of the first and second mirrors and to reflect the beam to travel along a path extending generally parallel to and spaced from said second recording surface; and
    first and second reflecting mirrors, one of said first and second reflecting mirrors positioned to reflect the beam of light when traveling said path extending generally parallel to and spaced from said first recording surface to travel along a path normal to such recording surface, the other of said first and second reflecting mirrors positioned to reflect the beam of light when traveling along said path extending generally parallel to and spaced from said second recording surface to travel along a path normal to such recording surface.

2. The apparatus as in claim 1 further including a flexure to constrain the motion of said member in a linear direction with respect to the path of the light beam.

3. The apparatus as in claim 1 wherein said member is made of a ferromagnetic material and said member is moved in reciprocation in response to a magnetic field generated by a stationary winding.

* * * * *